United States Patent [19]
Takahashi

[11] Patent Number: 6,073,066
[45] Date of Patent: Jun. 6, 2000

[54] SUSPENSION CONTROL SYSTEM AND METHOD FOR CAB OVER TYPE TRUCK

[75] Inventor: Toru Takahashi, Kanagawa, Japan

[73] Assignee: Unisia Jecs Corporation, Atsugi, Japan

[21] Appl. No.: 09/154,809

[22] Filed: Sep. 17, 1998

[30] Foreign Application Priority Data

Sep. 18, 1997 [JP] Japan .................................... 9-253856

[51] Int. Cl.[7] .............................................. B60G 17/015
[52] U.S. Cl. ...................... 701/37; 296/190; 180/89.12; 180/89.13; 180/89.16
[58] Field of Search ................................ 701/37, 38, 39; 296/181, 190; 280/5.5, 423.1; 180/89.12, 89.13, 89.16, 89.19, 14.1, 14.2

[56] References Cited

U.S. PATENT DOCUMENTS

| | | | |
|---|---|---|---|
| 4,111,273 | 9/1978 | Blackburn | 280/423.1 |
| 4,149,606 | 4/1979 | Hawk | 180/14.1 |
| 5,044,455 | 9/1991 | Tecco et al. | 180/89.13 |
| 5,497,862 | 3/1996 | Hoya | 188/282 |
| 5,555,501 | 9/1996 | Furihata et al. | 701/37 |
| 5,623,410 | 4/1997 | Furihata et al. | 701/37 |
| 5,779,009 | 7/1998 | Iwasaki | 188/299 |

FOREIGN PATENT DOCUMENTS

| | | |
|---|---|---|
| 5-26521 | 4/1993 | Japan . |
| 7-37864 | 7/1995 | Japan . |

*Primary Examiner*—Gary Chin
*Attorney, Agent, or Firm*—Foley & Lardner

[57] ABSTRACT

In a suspension control apparatus and method for a cab over type truck having a plurality of shock absorbers, each shock absorber being interposed between a vehicle cab of the truck and a vehicle chassis of the truck and having a damping force characteristic varying member arranged so as to enable a variation in the damping force characteristic of its corresponding shock absorber in response to an input control signal, a first detector is provided for detecting a behavior of the vehicle cab and for developing a signal indicative of the behavior of the vehicle cab, a basic damping force characteristic controller is provided for developing the control signal to control the damping force characteristic of each shock absorber via the corresponding damping force characteristic varying member on the basis of the vehicle cab behavior indicative signal developed by the first detector, a second detector is provided for detecting a behavior of the cab over type truck of a vehicle trailer hauled by the vehicle chassis and for developing a signal indicative of the behavior of the vehicle trailer, and a corrective controller is provided for modifying a value of the control signal developed by the basic damping force characteristic controller so as to correct the control of the damping force characteristic carried out by the basic damping force characteristic controller on the basis of the vehicle trailer behavior indicative signal.

10 Claims, 13 Drawing Sheets

SUSPENSION CONTROL SYSTEM AND METHOD FOR CAB OVER TYPE TRUCK

BACKGROUND OF THE INVENTION a) Field of the Invention

The present invention relates to suspension control system and method for a cab over type truck, viz., apparatus and method for controlling damping force characteristics of shock absorbers applicable to the cab over type truck.

b) Description of the Related Art

A Japanese Utility Model Registration Application (unexamined) Publication No. Heisei 7-37864 published on Jul. 14, 1995 exemplifies a previously proposed suspension control system for a cab over type truck.

The previously proposed suspension control system includes: damping force characteristic adjustable shock absorbers mounted at a cab part of the truck; a vehicle speed sensor arranged for detecting a running speed of the cab over truck; and a control unit arranged for controlling damping forces of the respective shock absorbers on the basis of the detected running speed value of the vehicle speed sensor.

Hence, during a relatively low running speed of the cab over type truck, a soft sense of feeling due to a low frequency input from a road surface can be suppressed from occurring in each of the shock absorbers and, during a relatively high running speed of the truck, a hard sense of feeling due to a high frequency input from the road surface can be suppressed from occurring in each of the shock absorber.

SUMMARY OF THE INVENTION

However, the previously proposed suspension control system has the following problem to be solved.

That is to say, in a vehicle in which a tractor of a cab over type truck hauls a trailer, during a vehicular acceleration or deceleration due to a braking, some behavior occurs in the trailer which is independent from the tractor due to a road surface resistance when road wheels located at the trailer side pass through recesses and convexes of the road surface. In addition, since the weights on the trailer are heavy, the tractor is largely pushed or pulled according to the behavior of the trailer, viz., the behavior of the trailer is transmitted to the tractor.

However, the transmitted behavior from the trailer can be detected by a detector mounted at the tractor side (tractor chassis or cab) as the behavior at the tractor side. Since the weights on the trailer are heavy and the behavior transmitted to the tractor is large, the cab suspension control based on the behavior detected by the tractor cannot suppress, especially, an initial behavior of the cab in relation to a control responsive characteristic.

It is therefore difficult to secure a stability and comfort of the cab of the cab over type truck.

With the above-described problem in mind, it is an object of the present invention to provide a suspension control system and method for a cab over type truck which can suppress a behavior of a cabin (vehicle cab) based on a behavior transmitted from a vehicle trailer to a tractor so as to secure the stability and comfort of the cab.

The above-described object can be achieved by providing apparatus for a cab over type truck, comprising: a plurality of shock absorbers, each shock absorber being interposed between a vehicle cab of the truck and a vehicle chassis of the truck and having a damping force characteristic varying member arranged so as to enable a variation in the damping force characteristic of its corresponding shock absorber in response to an input control signal; a first detector for detecting a behavior of the vehicle cab and for developing a signal indicative of the behavior of the vehicle cab; a basic damping force characteristic controller for developing the control signal to control the damping force characteristic of each shock absorber via the corresponding damping force characteristic varying member on the basis of the vehicle cab behavior indicative signal developed by the first detector; a second detector for detecting a behavior of a vehicle trailer of the cab over type truck hauled by the vehicle chassis and for developing a signal indicative of the behavior of the vehicle trailer; and a corrective controller for modifying a value of the control signal developed by the basic damping force characteristic controller so as to correct the control of the damping force characteristic carried out by the basic damping force characteristic controller on the basis of the vehicle trailer behavior indicative signal.

The above-described object can also be achieved by providing a method for controlling a damping force characteristic of each of shock absorbers, each shock absorber being interposed between a vehicle cab of a cab over type truck and a vehicle chassis of the truck and having a damping force characteristic varying member arranged so as to enable a variation in the damping force characteristic of its corresponding shock absorber in response to an input control signal, the method comprising the steps of; a) detecting a behavior of the vehicle cab; b) developing the control signal to control the damping force characteristic of each shock absorber via the corresponding damping force characteristic varying member on the basis of the detected vehicle cab behavior; c) detecting a behavior of a vehicle trailer of the cab over type truck hauled by the vehicle chassis; and d) modifying a value of the control signal so as to correct the control of the damping force characteristic on the basis of the vehicle trailer behavior.

BEST MODE FOR CARRYING OUT THE INVENTION

Reference will hereinafter be made to the drawings in order to facilitate a better understanding of the present invention.

Figure 1:
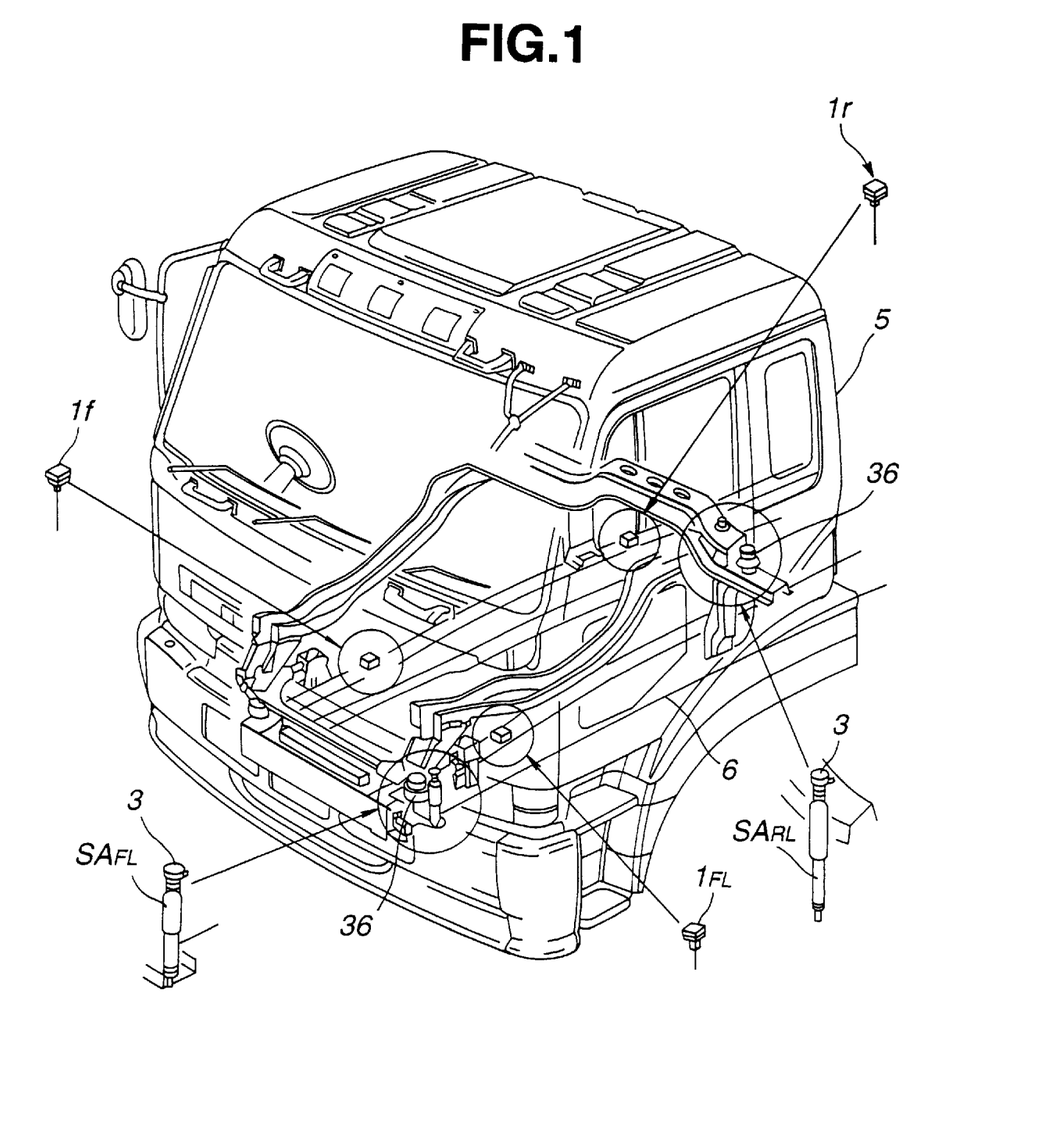
FIG. 1 is a side view of a tractor of a cab over type truck to which a preferred embodiment of a suspension control system is applicable.

FIG. 1 shows an explanatory perspective view of a cab over type truck, especially, a vehicle tractor to which a suspension control system in a preferred embodiment according to the present invention is applicable.

Figure 2:
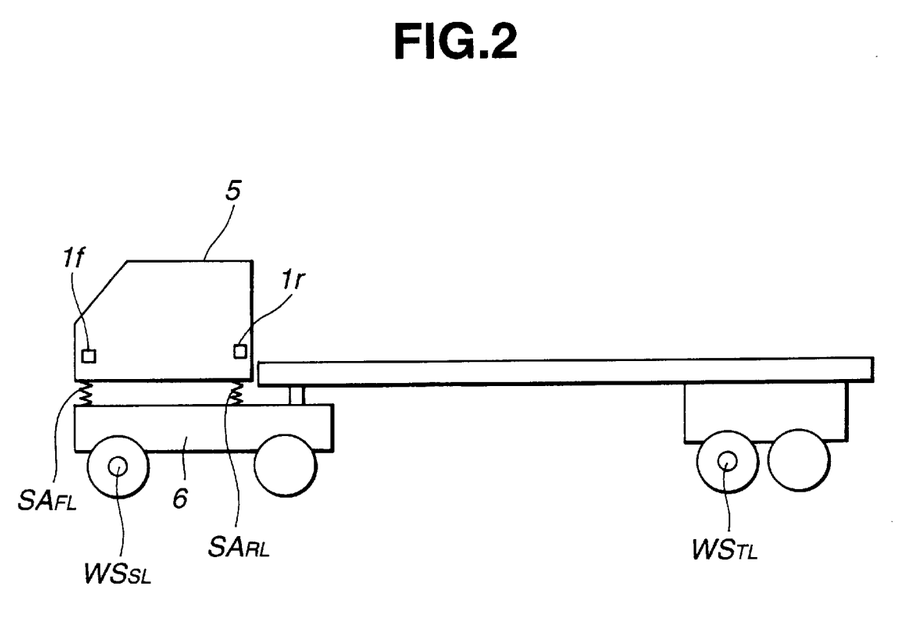
FIG. 2 is a schematic side view representing a whole rough structure of the cab over type truck to which the cab over type suspension control system shown in FIG. 1 is applicable.

FIG. 2 shows an explanatory side view of the whole cab over type truck to which the suspension control system in the preferred embodiment is applicable.

Figure 3:
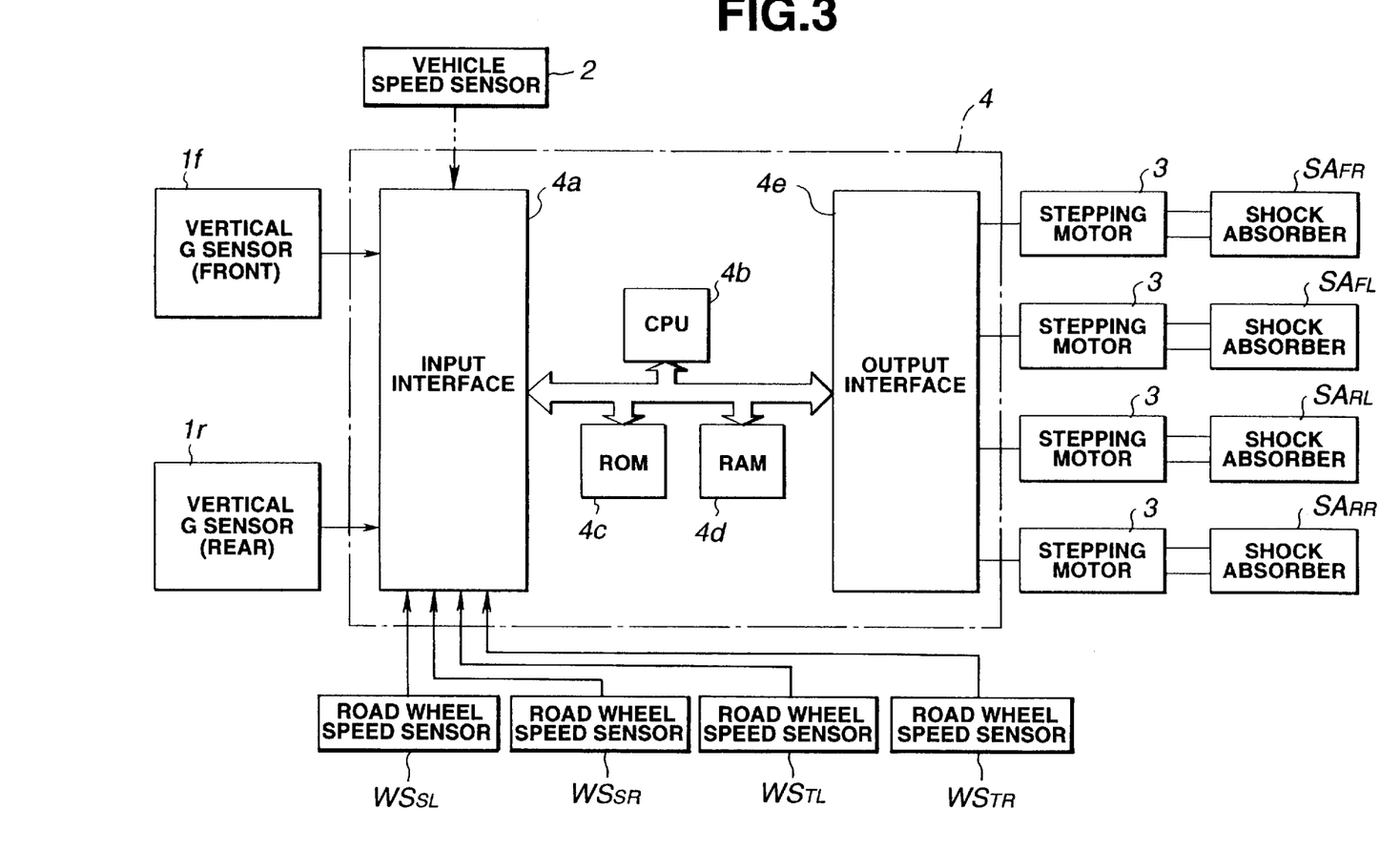
FIG. 3 is a circuit block diagram of the cab over type suspension control system shown in FIGS. 1 and 2.

FIG. 3 shows a circuit block diagram of the suspension control system in the preferred embodiment shown in FIGS. 1 and 2.

In FIG. 1, four shock absorbers, each shock absorber SA interposed between a cab 5 of the truck and a chassis 6 of the truck, namely, front left and right shock absorbers $SA_{FL}$ and $SA_{FR}$ and rear left and right shock absorbers SARL and $SA_{RR}$ are mounted on a tractor of the cab over type truck.

In addition, each aerial spring 36 is interposed between the cab 5 and chassis 6 at a position adjacent to a corresponding one of the front left and right and rear left and right shock absorbers $SA_{FL}$, $SA_{FR}$, $SA_{RL}$, and $SA_{RR}$ and respective subscripts of FL, FR, RL, and RR denote installed positions of front left, front right, rear left, and rear right (road wheels for the cab 5).

It is noted that each shock absorber SA and each aerial spring 36 are disposed symmetrically with each other so that a right side portion thereof (a left side portion as viewed from FIG. 1) is omitted in FIG. 1 for convenience.

In addition, a pair of vertical acceleration sensors $1_f$ and $1_r$ are mounted on the cab 5 located at approximately center positions between the front left and right shock absorbers $SA_{FL}$ and $SA_{FR}$ and between the rear left and right shock absorbers for detecting vertical accelerations $G_f$ and $G_r$ (a positive value in the case of an upward motion (behavior) and a negative value in the case of a downward motion (behavior)).

In addition, as shown in FIG. 2, road wheel speed sensors WS ($WS_{SL}$, $WS_{SR}$, $WS_{TL}$, $WS_{TR}$) are mounted on front left and front right road wheels located at the chassis 6 of the tractor and those located at a trailer for detecting respective road wheel speeds WV ($WV_{SL}$, $WV_{SR}$, $WV_{TL}$, $WV_{TR}$) Furthermore, a vehicle speed sensor 2, as shown in FIG. 3, is installed to detect a running speed of the cab over type truck.

A controller 4 is, as shown in FIG. 3, installed on the truck for outputting a control signal to a stepping motor 3 associated with each corresponding shock absorber SA on the basis of output signals from the respective vertical acceleration sensors $1_f$ and $1_r$, the respective road wheel sped sensors $WS_{SL}$, $WS_{SR}$, $WS_{TL}$, and $WS_{TR}$, and a vehicle speed signal VB of the vehicle speed sensor 2.

The controller 4 includes: an input interface 4a; a CPU 4b; a ROM 4c; aRAM 4d; an output interface 4e including a driver for each stepping motor 3, and a common bus.

Figure 14:
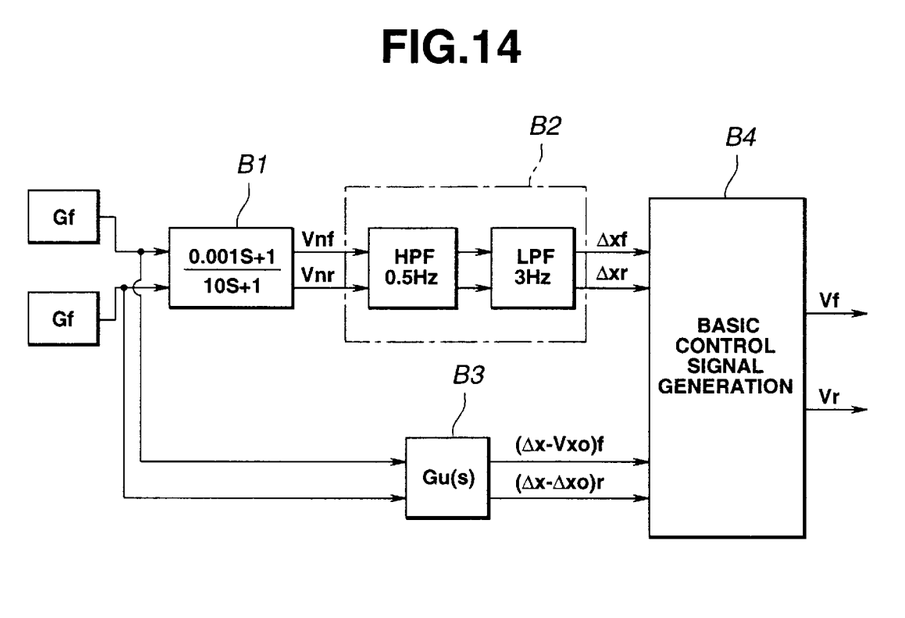
FIG. 14 is a circuit block diagram of a signal processing circuit to derive a basic control signal in the suspension control system shown in FIG. 3.

The input interface 4a is provided with a first signal processing circuit in terms of a firmware version which, as shown in FIG. 14 which will be described later, receives sprung mass vertical acceleration signals $G_f$ and $G_r$ from the respective vertical G sensors $1_f$ and $1_r$, road wheel speeds $WV_{SL}$, $WV_{SR}$, $WV_{TL}$, and $WV_{TR}$ from the road wheel speed sensors $WS_{SL}$, $WS_{SR}$, $WS_{TL}$, and $WS_{TR}$, and vehicle speed signal BV from the vehicle speed sensor 2.

The input and output interface circuits 4a and 4e includes the first signal processing circuit (refer to FIG. 14) for deriving basic control signals $V_f$ and $V_r$ to perform a basic damping force characteristic control over the front left and right shock absorbers $SA_{FL}$ and $SA_{FR}$ and the rear left and right shock absorbers $SA_{RL}$ and $SA_{RR}$ mounted on the cab 5 from the sprung mass vertical acceleration signals $G_f$ and $G_r$ and a second signal processing circuit (refer to FIG. 15) to perform cab behavior correction values $vp*K_f$ and $vp*K_r$ to be added to the basic control signal values $V_f$ and $V_r$ from the road wheel speed signal $WV_{SL}$ of the front left road wheel of the tractor, the road wheel speed signal WVTL of the front left road wheel of the trailer and the vehicle speed signal BV (the cab over type truck running speed) detected by the vehicle speed sensor 2. The details of the first and second signal processing circuits will be described later.

Figure 4:
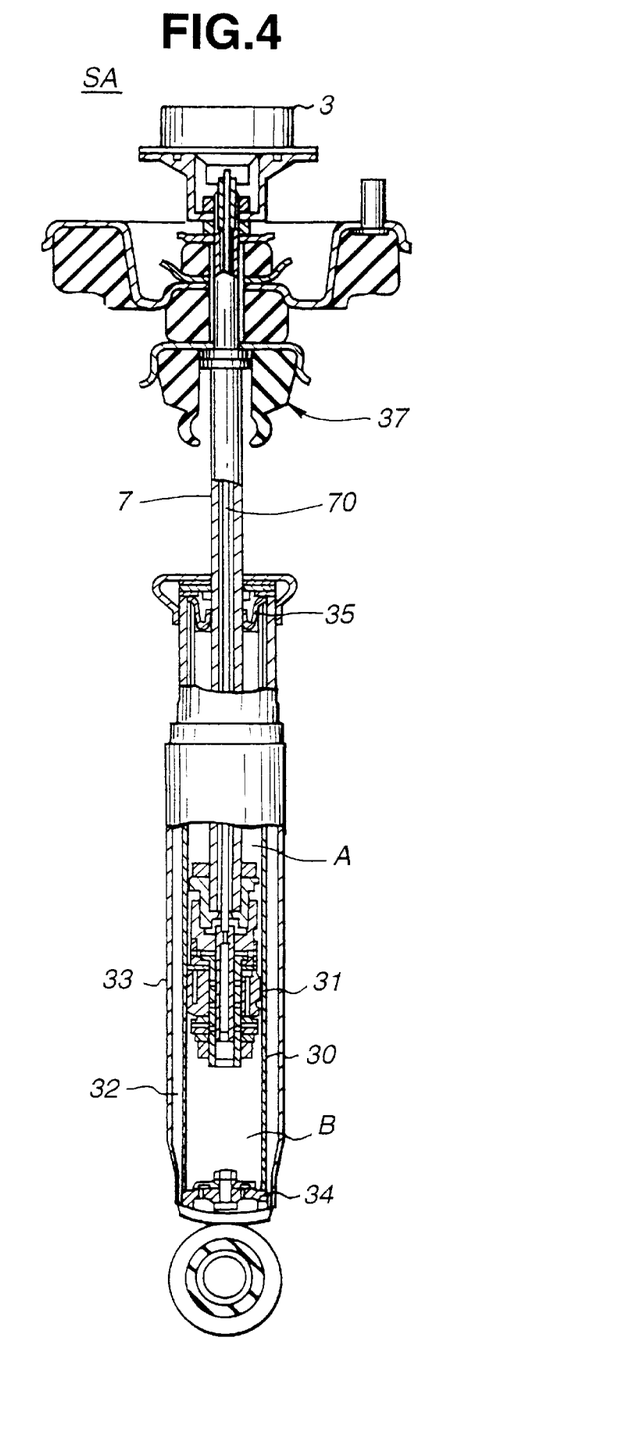
FIG. 4 is a cross sectional view of a representative shock absorber used in the cab over type suspension control system shown in FIGS. 1 to 3.

Next, FIG. 4 shows a cross sectional view of the shock absorber SA used in the embodiment of the suspension control system according to the present invention.

The shock absorber SA includes a cylinder 30, a piston (assembly) 31 for defining an upper chamber A and a lower chamber B, an outer envelope 33 forming a reservoir chamber 32 on an outer periphery of the cylinder 30, a base 34 defining a lower chamber B and reservoir chamber 32, a guide member 35 for guiding a slidable motion of a piston rod 7 linked to the piston 31, and a bumper rubber 37.

It is noted that a representative one of the four shock absorbers $SA_{FL}$, $SA_{FR}$, $SA_{RL}$, and $SA_{RR}$ is denoted merely by SA.

Figure 5:
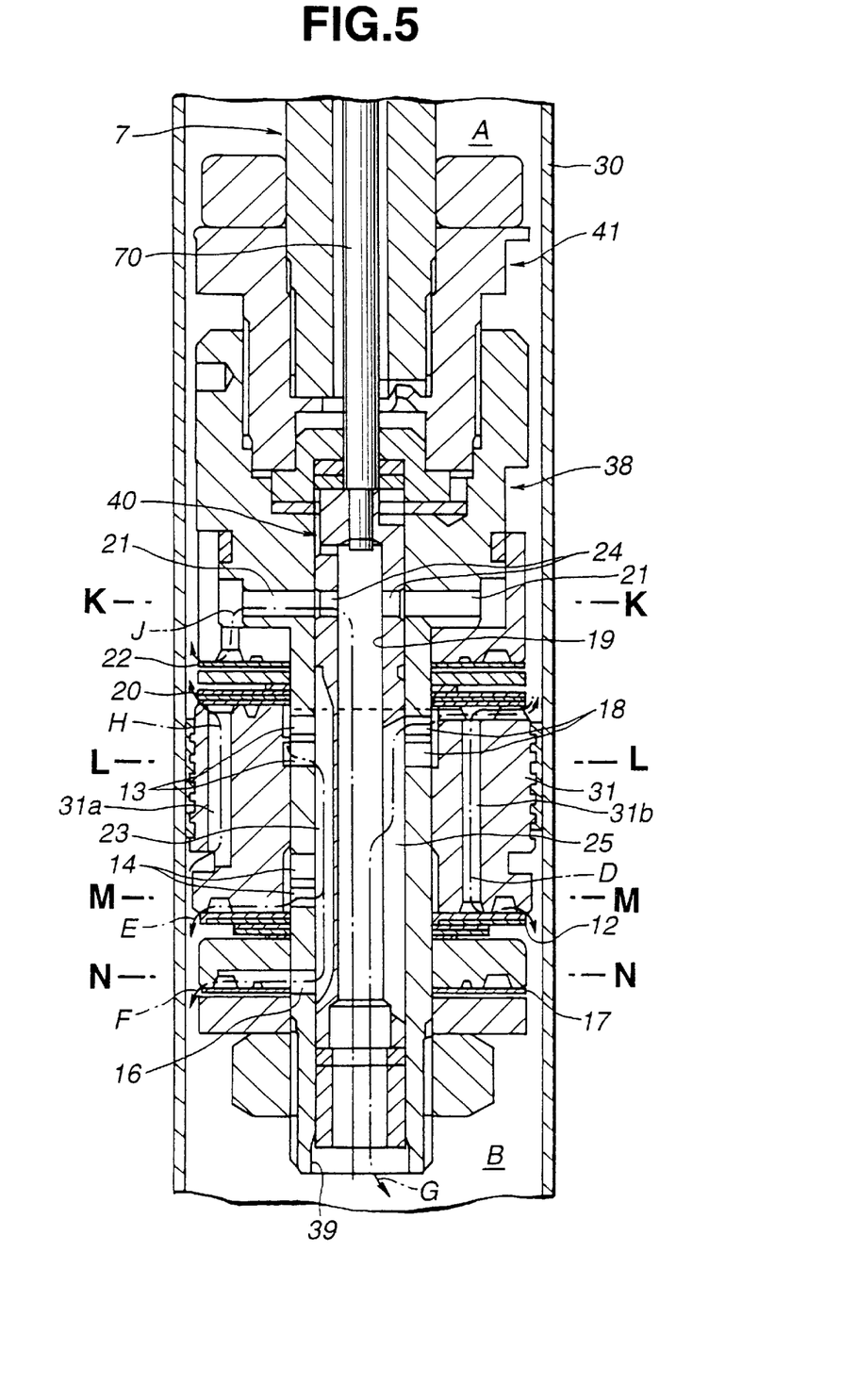
FIG. 5 is an enlarged cross sectional view of an essential part of the shock absorber shown in FIG. 4.

FIG. 5 shows an enlarged cross sectional view representing a part of the piston assembly 31 and its surrounding part of each of the shock absorbers SA.

As shown in FIG. 5, the piston 31 is formed with penetrating holes 31a and 31b therethrough. In addition, the piston 31 is provided with a compression phase attenuation valve 20 and an extension phase attenuation valve 12, both of the valves 20, 12 respectively opening and closing the respective penetrating holes 31a and 31b. A stud 38 is spirally meshed with and fixed to a bound stopper 41 spirally meshed with and fixed to a tip end of the piston rod 7.

The stud 38 is penetrated through the piston 31. In addition, the stud 38 is formed with a communication hole 39 so as to communicate with the upper portion chamber A and the lower portion chamber B. In the communication hole 39 forming flow passage (an extension phase second flow passage E, extension phase third flow passage F, bypass flow passage G, and compression phase second passage as will be described later). Then, the adjuster 40 which changes flow passage cross sectional areas of the above-described flow passage is provided within the communication hole 39.

Furthermore, an extension phase side check valve 17 and a compression phase side check valve 22 are also installed on an outer periphery of the stud 38, which enable and disable the fluid flow through the above-described flow passages formed by the communication hole 39 in accordance with a direction of the flow of the fluid. As shown in FIG. 5, the adjuster 40 is rotatable by means of the corresponding one of the actuators (stepping motors) 3 via the control rod 70.

It is noted that the stud 38 is formed with a first part 21, a second port 13, a third port 18, a fourth port 14, and fifth port 16, respectively, in an upper order (sequence).

On the other hand, referring to FIG. 5, the adjuster 40 is formed with a hollow portion 19, a first lateral hole 24, and a second lateral hole 25, both lateral holes communicating the internal and external portions of the adjuster 40. A longitudinal groove 23 is formed on an outer peripheral portion. Hence, four flow passages are formed between the upper portion chamber A and the lower portion chamber B as the fluid flow passages when the piston stroke indicates the extension phase: namely, 1) an extension phase first flow passage D such that the fluid passes the penetrating hole 31b, a valve opened internal side of the extension phase side attenuation valve 12, and reaches the lower portion chamber B; 2) an extension phase second flow passage E in which the fluid flows through the second port 13, the longitudinal groove 23, the fourth port 14, a valve opened outer peripheral side of the extension phase side attenuation valve 12, and reaches the lower portion chamber B; 3) an extension phase side third flow passage F in which the fluid passes through the third port 18, the second internal hole 25, and the hollow portion 19 and reaches the lower portion chamber B.

In addition, the three fluid flow passages through which the fluid can be caused to flow during the compression phase side of the piston 31 includes: 1) a compression phase (stroke side) first flow passage H in which the fluid flows through the penetrating hole 31a and valve opened compression stroke side (phase) second flow passage J in which the hollow portion 19, the first lateral hole 24, the first port 21, and the opened compression phase (stroke side) check valve 22 and reaches the upper portion chamber A; and 3) the bypass passage G in which the fluid flows through the hollow portion 19, the second lateral hole 25, and the third port 18.

Figure 6:
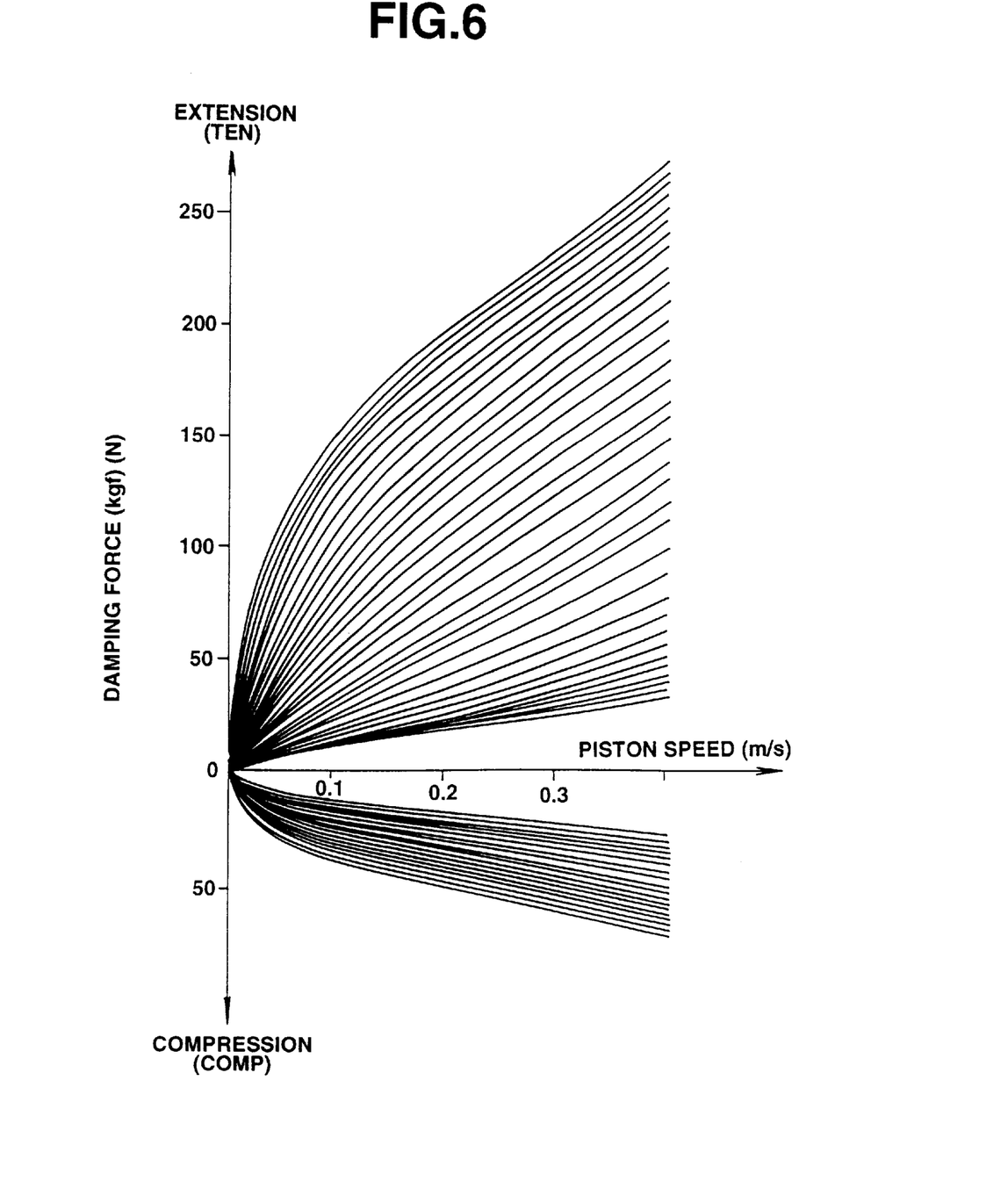
FIG. 6 is a characteristic graph representing a damping force characteristic of the representative shock absorber shown in FIG. 4 with respect to a piston speed of the shock absorber.

In summary, the shock absorber SA is so arranged and constructed as to be enabled to change the damping force characteristics at a multiple stage in its damping force characteristic, as shown in FIG. 6, either in the extension phase or compression phase when the adjuster 40 is pivoted according to the rotation of the corresponding one of the stepping motors 3.

Figure 7:
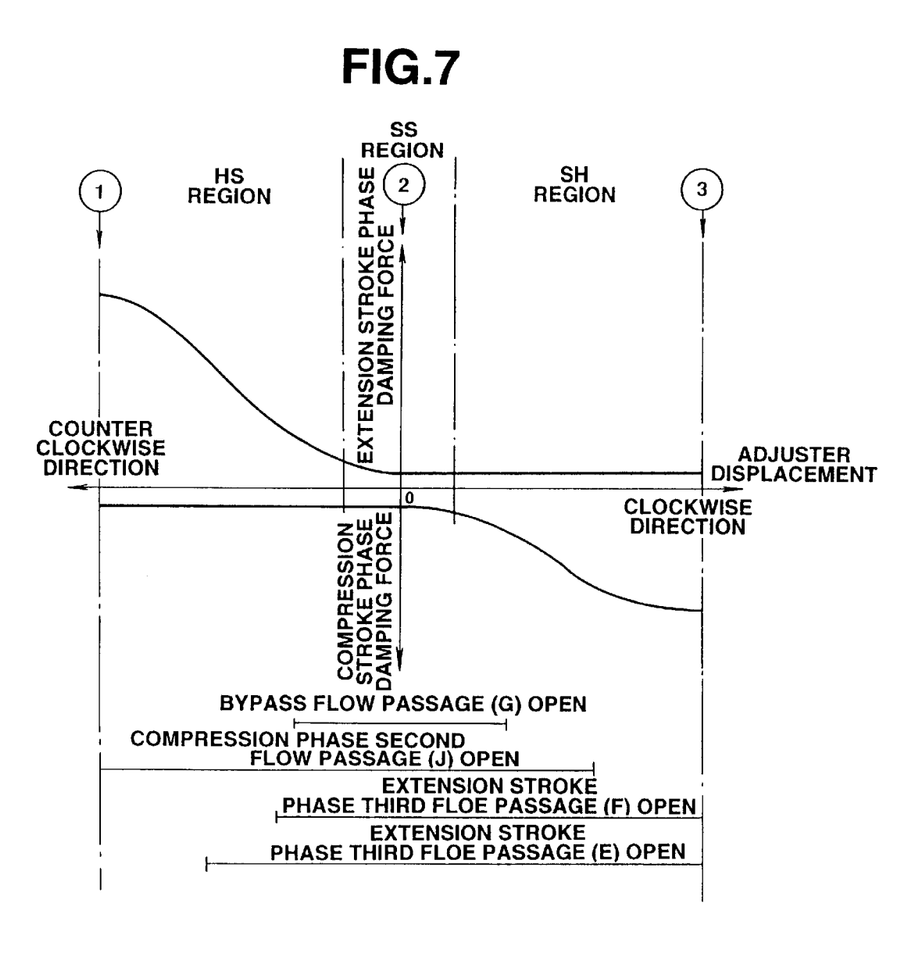
FIG. 7 is a characteristic graph of the damping force characteristic corresponding to a stepped position of a corresponding stepping motor.

FIG. 7 shows relationships between the rotated position of the adjuster 40 and damping force characteristics at both of the extension phase and compression phase with respect to the piston 31.

In details, as shown in FIG. 7, when the adjuster 40 is pivoted in a given counterclockwise direction from a generally center position at which both of the extension and compression phases are in soft damping force characteristic positions (also, referred to as a soft region (soft control mode) SS), the damping force coefficient at the extension phase can be changed at the multiple stage from a maximum hard to a minimum hard characteristic but the compression stroke side is fixed at a soft position (also, referred to as an extension stroke side (phase) hard region HS). On the contrary, when the adjuster 40 is pivoted in a given clockwise direction therefrom, the damping force characteristic at the multiple stages and the damping force characteristic in the compression stroke side is fixed to the soft position (also, referred to as a compression hard region (compression phase hard) SH).

Figure 8A:
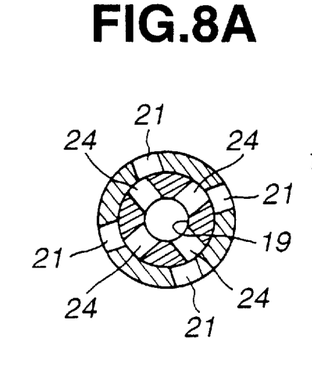
FIGS. 8A, 8B, and 8C are cross sectional views cut away along a line of K—K in FIG. 6.
Figure 8B:
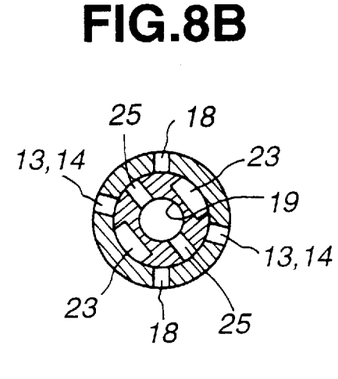
Figure 8C:
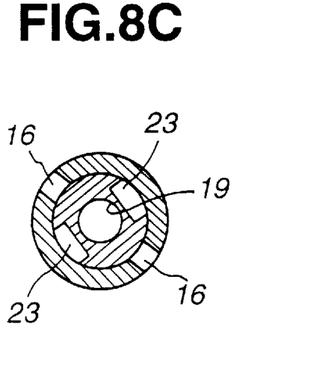
Figure 9A:
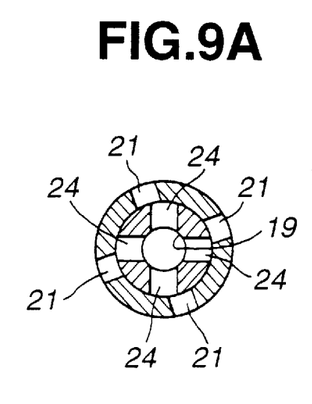
FIGS. 9A, 9B, and 9C are cross sectional views cut away along a line of L—L and a line of M—M in FIG. 6.
Figure 9B:
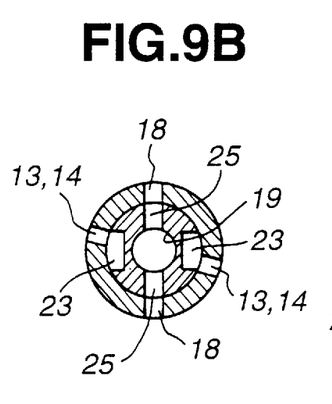
Figure 9C:
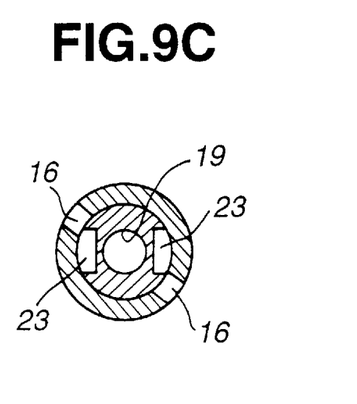
Figure 10A:
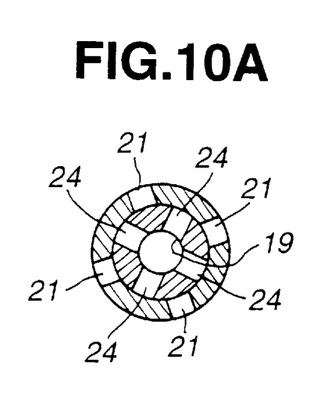
FIGS. 10A, 10B, and 10C are cross sectional views cut away along a line of N—N in FIG. 6.
Figure 10B:
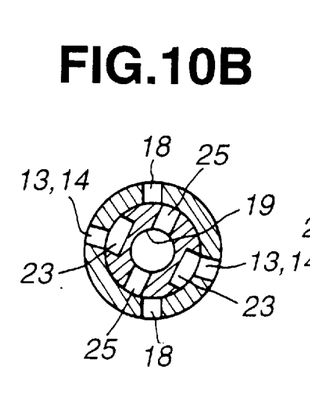
Figure 10C:
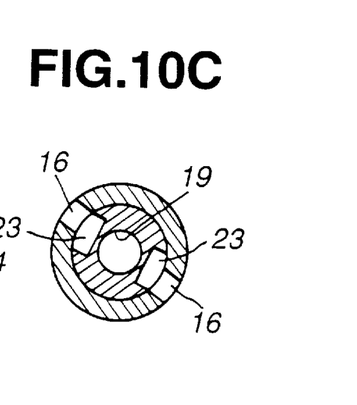

When, as shown in FIG. 7, the adjuster 40 is pivoted at any one of positions ①, ②, and ③, cross sections of the piston assembly portions cut away along lines K—K, L—L, M—M, and N—N of FIG. 5 are respectively shown in FIGS. 8A (①), 8B (②), and 8C (③) (K—K), 9A (①) 9B (②), and 9C (③) (L—L, M—M), 10A (①), 10B (②), and 10C (③) (N—N), respectively.

Figure 11:
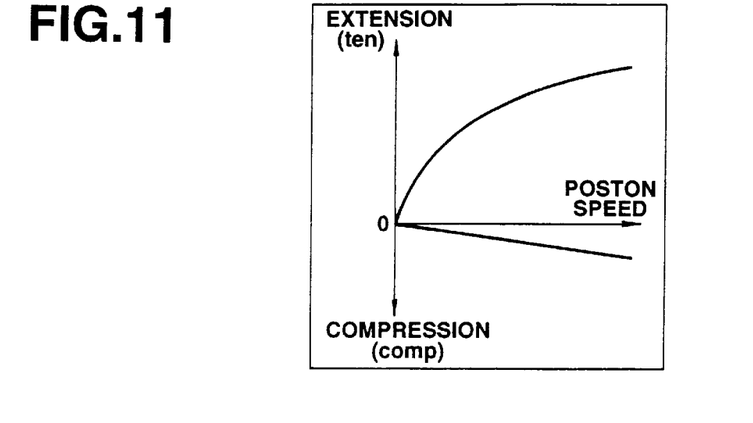
FIG. 11 is a characteristic graph representing a hard characteristic at an extension phase of the representative shock absorber shown in FIG. 6.
Figure 12:
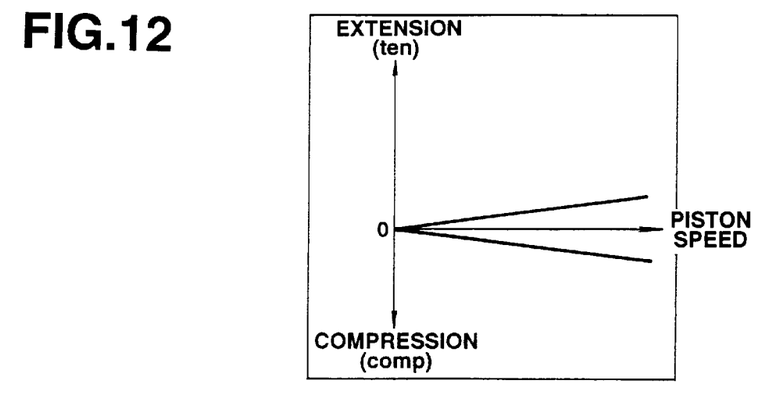
FIG. 12 is a characteristic graph representing both soft characteristics at the extension and compression phase of the respective shock absorbers.
Figure 13:
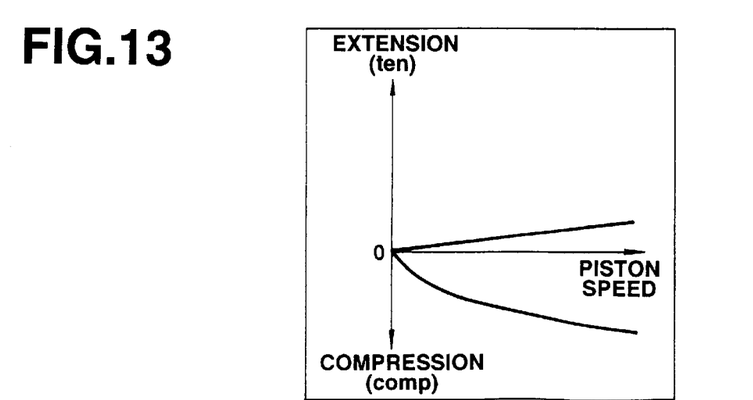
FIG. 13 is a characteristic graph representing a hard characteristic at the compression phase of the shock absorber.

The damping force characteristics at the respective portions ①, ②, and ③ shown in FIG. 7 are shown in FIGS. 11, 12, and 13, respectively.

FIG. 11 shows the damping force characteristic of the representative shock absorber SA when the adjuster 40 is positioned at ① of FIG. 7.

FIG. 12 shows that when the adjuster 40 is positioned at ② of FIG. 7.

FIG. 13 shows that when the adjuster 40 is positioned at ③ of FIG. 7.

Next, FIG. 14 shows a block structure of the first signal processing circuit in the input interface circuit 4a of the controller 4.

The signal processing circuit shown in FIG. 14 receives the sprung mass vertical acceleration signals $G_f$ and $G_r$ of the vertical G sensors $1_f$ and $1_r$ located at front and rear positions of the cab 5 and derives the basic control signal $V_f$ and $V_r$ to perform the basic damping force characteristic controls for the front left and right shock absorbers $SA_{FL}$ and $SA_{FR}$ of the cab 5 and for the rear left and right shock absorbers $SA_{RL}$ and $SA_{RR}$ of the cab 5.

That is to say, at a block B1 in FIG. 14, the sprung mass vertical acceleration signals $G_f$ and $G_r$ located at the front and rear sides of the cab 5 (the sprung mass is the cab 5 and an unsprung mass is the chassis 6) and detected by the left and right vertical G sensors $1_f$ and $1_r$ (as viewed from FIG. 1) are respectively converted into sprung mass vertical velocity signals Vnf and Vnr using a phase advance/lag compensation filter having a transfer function of (0.001s+ 1/(10s+1) (s denotes a Laplace transform operator).

At a block B2, a band pass filter processing is carried out to cut off components except a target frequency band of the sprung mass vertical velocity signals Vnf and Vnr to be controlled (viz., sprung mass resonance frequency band) so that the sprung mass vertical velocity signals Δxf and Δxr at the front and rear positions of the cab 5 are derived.

On the other hand, at a block B3 in FIG. 14, the first signal processing circuit derives a relative velocity signals (Δx−Δx₀)f and (Δx−Δx₀)r between the front and rear positions of the cab 5 on the basis of a transfer function Gu (s) from the corresponding sprung mass vertical velocities to the corresponding sprung mass relative velocities between the sprung mass and unsprung mass expressed in an equation (1).

$$Gu(s) = -m*s/(c*s+k) \tag{1}$$

In the equation (1), m denotes the sprung mass (cab 5), c denotes a damping coefficient of the suspension, and k denotes a spring constant of the suspension.

At a block B4 subsequent to the blocks B2 and B3, the first signal processing circuit derives the basic control signals $V_f$ and $V_r$ to perform the basic damping force characteristic controls for the front left and right shock absorbers $SA_{FL}$ and $SA_{FR}$ and for the rear left and right shock absorbers $SA_{RL}$ and $SA_{RR}$ of the cab 5 on the basis of the following equations (2) and (3) from the front and rear sprung mass vertical velocity signals Δxf and Δxr and front and rear relative velocity signals $(\Delta x - \Delta x_0)f$ and $(\Delta x - \Delta x_0)r$ of the cab 5.

$$Vf = Cf*(\Delta xf/(\Delta x - \Delta x_0)f) \tag{2}$$

$$Vr = Cr*(\Delta xr/(\Delta x - \Delta x_0)r) \tag{3}$$

In the equation (2), Cf denotes a front damping coefficient, and, in the equation (3), Cr denotes a rear damping coefficient.

Figure 15:
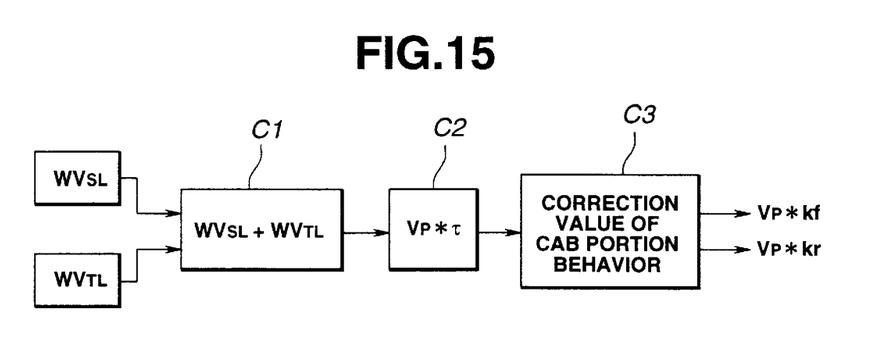
FIG. 15 is a circuit block diagram of the signal processing circuit to derive a correction value of the cab behavior in the preferred embodiment of the suspension control system shown in FIG. 3.

Next, FIG. 15 shows a structure of the second signal processing circuit in the output interface circuit 4e of the controller 4.

That is to say, the second signal processing circuit derives cab behavior correction values $vp*K_f$ and $vp*K_r$ to be correctively included to the respectively corresponding basic control signals Vf and Vr from the road wheel speed signals $WV_{SL}$ and $WV_{TL}$.

First, at a block Cl of FIG. 15, the second signal processing circuit derives a road wheel speed difference Vp between the road wheel speed signal $WV_{SL}$ at the tractor left front road wheel and that $WV_{TL}$ at the tractor left front road wheel. At the subsequent block C2, the second signal processing circuit multiplies the road wheel speed difference Vp by a predetermined function τ to convert the speed difference into the cab behavior.

This function τ to convert the speed difference into the cab behavior includes a band pass filter having a predetermined characteristic of a filter characteristic equal to or more than a first-order through which the speed difference is passed to derive the correction value vp corresponding to the cab behavior or a previously calculated function τ which has been calculated from an actually measured value with a measurement instrument is mounted on the cab over type truck or through an experiment in order to convert it into a cab bouncing behavior or cab pitching behavior (cab bouncing behavior/road wheel speed difference or cab pitching behavior/road wheel speed difference) solely or a total weight mean of a plurality of functions. It is noted that, as the function τ, a time-discrete approximation is used.

Furthermore, at a block C3, the second signal processing circuit multiplies the correction value vp by the correction coefficients $K_f$ and $K_r$ based on the vehicle speed signal BV to derive the cab behavior correction values $vp*K_f$ and $vp*K_r$ according to the vehicle speed BV.

Next, the controller 4, viz., the second signal processing circuit derives the control signal $V(V_{FL}, V_{FR}, V_{RL}, V_{RR})$ used to perform the damping force characteristic controls for the cab front left and right shock absorbers $SA_{FL}$, $SA_{FR}$, $SA_{RL}$, and $SA_{RR}$ on the basis of the following equations (4), (5), (6), and (7) from the basic control signals $V_f$ and $V_r$ and the cab behavior correction values $vp*K_f$ and $vp*K_r$.

$$V_{FL} = V_f + vp*K_f \tag{4}$$

$$V_{FR} = V_f + vp*K_f \tag{5}$$

$$V_{RL} = V_r - vp*K_r \tag{6}$$

$$V_{RR} = V_r - vp*K_r \tag{7}$$

Figure 16:
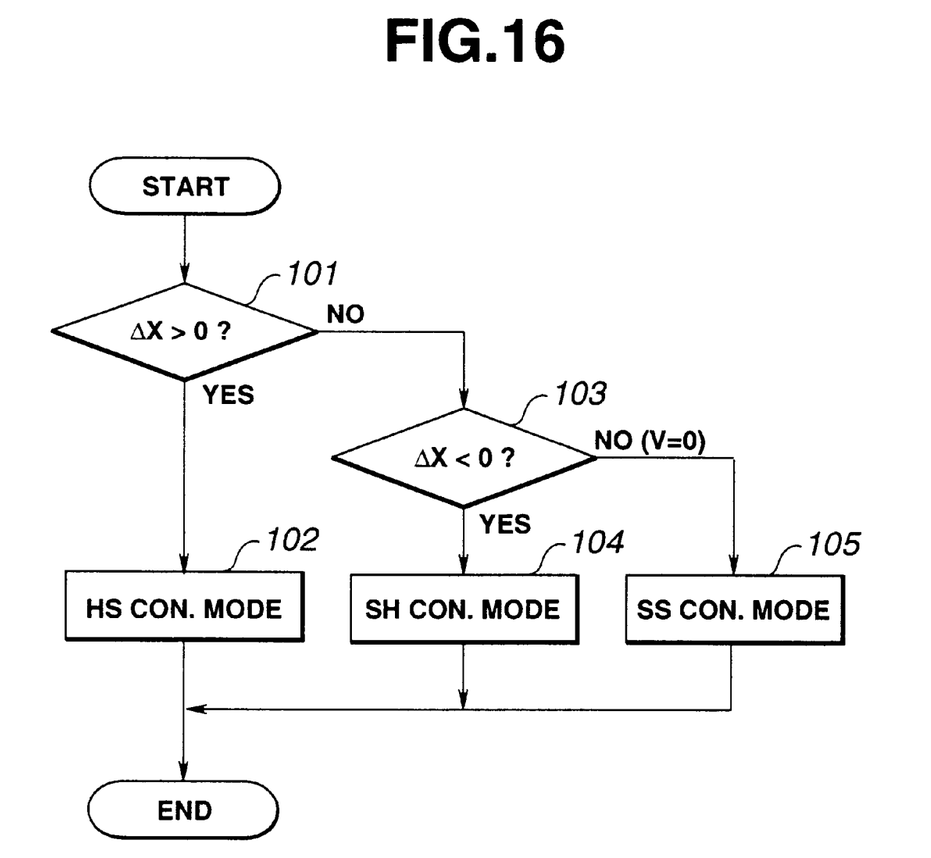
FIG. 16 is an operational flowchart representing a content of the damping force characteristic control in the preferred embodiment of the suspension control system shown in FIG. 3.

Next, FIG. 16 shows a control operation on the damping force characteristic of each shock absorber SA in the controller 4. The basic control operation is carried out for each shock absorber $SA_{FL}$, $SA_{FR}$, $SA_{RL}$, and $SA_{RR}$.

That is to say, a target damping force characteristic position P $(P_T, P_C)$ for each shock absorber SA is calculated by the CPU 4b on the basis of the operational flowchart shown in FIG. 16.

At a step 101 of the flowchart in FIG. 16, the CPU 4b determines whether the control signal V based on the sprung mass vertical velocity signal Δx indicates positive.

The routine goes to a step 102 in which the CPU 4b is operated to control each shock absorber SA to the extension stroke phase hard region HS if the CPU 4b determines that V>0 at the step 101. If the CPU 4b determines that Δx≦0 at the step 101, the routine goes to a step 103 in which the CPU 4b determines whether V<0.

If Yes at the step 103 (V<0), the routine goes to a step 104 in which the CPU 4b controls each shock absorber SA to the compression phase hard region SH.

If No at the step 103 (V=0), the routine goes to a step 105 in which the CPU 4b controls each shock absorber SA to both of the compression and extension phases in SS mode (soft and soft).

That is to say, if the control signal V is varied as shown in timing charts shown in FIGS. 16A, 16B, 16C, 16D, and 16E, the shock absorbers SA are controlled in the soft region SS when the signal value V is zeroed.

In addition, when the control signal V indicates positive, the extension phase hard region HS is controlled so that the damping force characteristic at the compression phase is fixed to the soft characteristic and the damping force characteristic at the extension phase constituting the control signal (target damping force characteristic position $P_T$) is varied in proportion to the control signal V based on the following equation (8).

$$P_T = \delta T*V \tag{8}$$

In the equation (8), δT denotes a constant at the extension phase side of each corresponding shock absorber SA In addition, if the value of the control signal V indicates negative, the control is returned to the compression phase hard region SH to modify the compression phase damping force characteristic (target damping force characteristic Pc) in proportion to the control signal V based on the sprung mass vertical velocity Δx on the basis of the following equation (9).

$$P_C = \delta c*V \tag{9}$$

In the equation (9), δc denotes a constant at the compression phase of each corresponding shock absorber.

Next, FIGS. 17A through 17E integrally show a timing chart for explaining a switching operation state in a controllable region of each of the shock absorbers SA in the damping force characteristic control operation of the controller 4.

As shown in timing charts of FIG. 17A through 17E, the region a denotes a state wherein the control signal V based on the sprung mass vertical velocity is reversed from the negative value (downward) to a positive value (upward). At this time, since the relative velocity between the sprung mass (cab 5) and the unsprung mass (chassis 6) indicates the negative region (the compression phase side toward which the corresponding shock absorber SA strokes) on the basis of the direction of the control signal V, the compression stroke side which is the stroke of the shock absorber SA indicates the soft characteristic.

In addition, the region b indicates the region switched from the negative value to the positive value (extension stroke side toward which the shock absorber SA strokes) on the relative velocity between the sprung mass and the unsprung mass with the control signal V being still left to indicate the positive value (upward).

At this time, the shock absorber SA is controlled at the extension phase hard region SH on the basis of the direction of the control signal V. In addition, since the stroking phase of the shock absorber SA is also in the extension phase, hence, the extension stroking phase of the shock absorber SA indicates the hard characteristic in proportion to the value of the control signal V.

In addition, the region c is a state wherein the control signal V is reversed from the positive value (upward) to the negative value (downward). At this time, since the relative velocity between the sprung mass and unsprung mass indicates positive (extension phase side of the stroke of the shock absorber SA), the shock absorber SA is controlled to the compression phase hard region SH on the basis of the direction of the control signal V. Hence, at the region c, the compression phase side of the shock absorber SA indicates the hard characteristic in proportion to the value of the signal $\Delta x$.

Furthermore, at the region of d, since this region d is a region wherein the relative velocity ($\Delta x - \Delta x_0$) indicates the switching from the positive value to the negative value (the stroking phase of each corresponding shock absorber SA is the extension phase), the control signal V remaining indicating the negative value (downward), each corresponding shock absorber SA based on the direction of the compression phase hard region (SH mode) and the stroke direction of each control signal V is the compression phase. Hence, at this region of d, the compression phase which each corresponding shock absorber strokes provides the hard characteristic in proportion to the value of the control signal V.

As described above, in the embodiment according to the present invention, when the sign of the control signal V based on the sprung mass vertical velocity $\Delta x$ and that of the relative velocity between the sprung mass and the unsprung mass ($\Delta x - \Delta x_0$) are the same (region b and the region d), the stroking side of the shock absorber SA is controlled to the hard characteristic, the stroking side of the shock absorber SA is controlled to the hard characteristic. When the signs described above are different (the region a and the region c) from each other, the instantaneous shock absorber SA falls in the soft characteristic. The same control as the damping force characteristic based on the Skyhook (control) theorem (a reference control rule) is carried out only by means of the control signal V.

In addition, when the stroking position of each corresponding shock absorber SA is switched, namely, the control is transferred from the region a to the region b and the control is transferred from the region c to the region d (from the soft characteristic to the hard characteristic), the damping force characteristic position at the switching stroke side is already carried out at the previously passed regions a and c so that the switching from the soft characteristic to the hard characteristic is carried out without delay in time. As a result of this, a high control responsive characteristic is achieved and the switching between the hard characteristic and the soft characteristic is carried out without the drive of each corresponding one of the stepping motor 3. Hence, the durability of each stepping motor 3 can be improved and the saving of the power consumption can be achieved.

The suspension control system in the preferred embodiment has the following items of merits.

(1) Since the basic control signals Vf and Vr derived from the sprung mass vertical acceleration signals Gf and Gr on the front and rear positions of the cab 5 are corrected by the road wheel speed difference vp between the road wheel velocity signal $WV_{SL}$ of the tractor front left road wheel and the road wheel velocity signal $WV_{TL}$ of the trailer, an initial behavior of the cab based on the behavior transmitted from the trailer to the tractor can be suppressed without a control delay.

(2) Since the correction value vp is used which multiplies the road wheel speed difference vp by the function $\tau$ which converts the road wheel speed difference into the cab behavior, the correction value which corresponds to the cab behavior can simply be determined.

(3) Since the correction value vp is multiplied by the front and rear correction coefficients $K_f$ and $K_r$ based on the vehicle speed BV, respectively, the cab behavior correction values vp*$K_f$ and vp*$K_r$ are derived according to the vehicle speed. Consequently, the transmission behavior which varies according to the vehicle speed can be corrected. Consequently, a more accurate cab correction can be made.

(3) Since only road wheel speed signal can detect the trailer behavior, it is not necessary to install newly the cab over type truck in which an anti-skid control system (ABS) is mounted so that a total cost of installing the suspension control system in the preferred embodiment on the cab over type truck can be saved.

(4) Since, in the damping force characteristic based on the Skyhook theorem, the switching from the soft characteristic to the hard characteristic can be carried out without delay.

Thus, the high control responsive characteristic can be achieved without the drive of an actuator (each corresponding stepping motor 3). Consequently, the durability of each stepping motor 3 can be improved and a saving of the power consumption can become possible.

In the preferred embodiment, the cab behavior detector includes the vertical G sensors on the front center position of the cab 5 and on the rear center position of the cab 5. However, the vertical G sensors may be installed on the vehicle cab adjacent to the front left and right and the rear left and right positions at which the respective shock absorbers $SA_{FL}$, $SA_{FR}$, $SA_{RL}$, and $SA_{RR}$ are mounted. Types of the cab behavior detection may be arbitrary.

In the preferred embodiment, the road wheel speed sensors are used to detect the behavior of the vehicle trailer. However, the same vertical G sensors, longitudinal G sensors, or lateral G sensors or a combination of these sensors may be used to detect the behavior of the trailer. The term of behavior has the same meaning of a motion.

In addition, in the preferred embodiment, the road wheel speed difference vp is derived from both of the road wheel speed signal $WV_{TL}$ of the front left road wheel of the trailer and the road wheel speed signal $WV_{SL}$ of the front left road wheel of the tractor. However, average values of the left and right road wheels of the tractor and trailer may be used to derive the road wheel speed difference vp.

Figure 18:
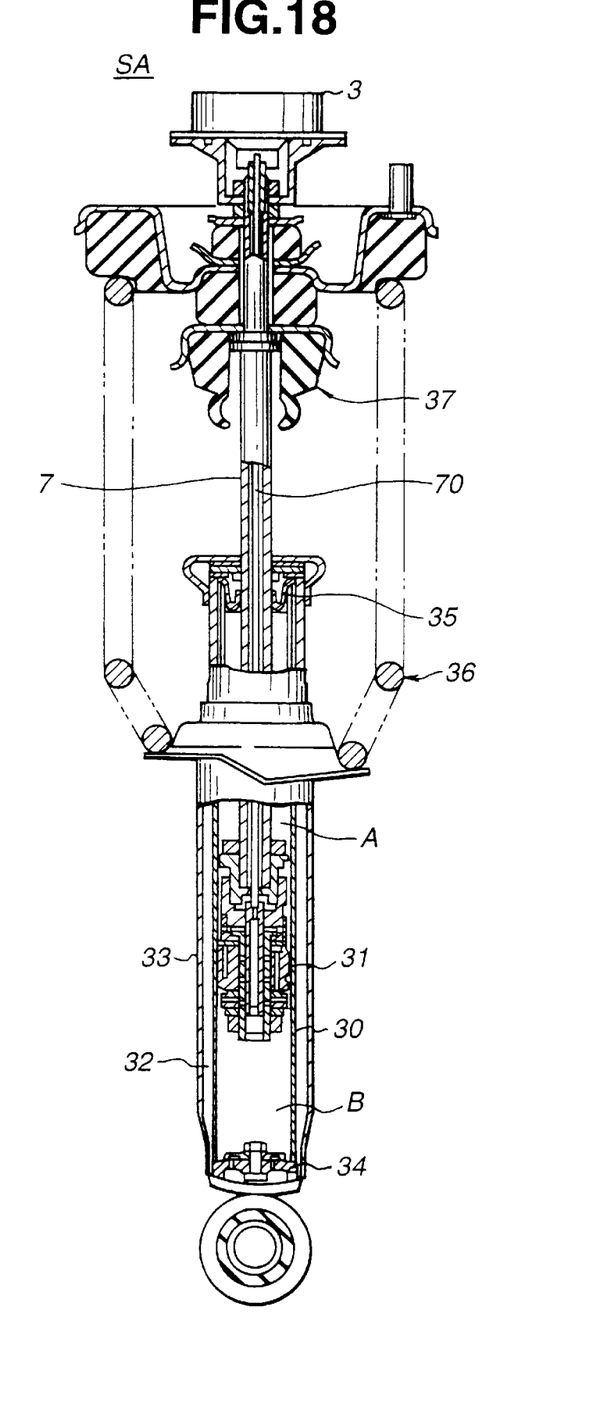
FIG. 18 is a cross sectional view of another shock absorber in which a suspension spring is used in place of an air spring shown in FIG. 4.

In the preferred embodiment, as shown in FIG. 4, the aerial spring is provided on each shock absorber SA. However, as shown in FIG. 18, a suspension spring 36 provided on each shock absorber SA may be used.

In addition, in the preferred embodiment, the soft region (SS) in each of the extension and compression phases is set only when the control signal V is zeroed.

However, a predetermined dead zone with the zero control signal as a center is provided.

While the control signal V falls within the range in the dead zone, the damping force characteristic is maintained at the soft region SS so that a control hunting can be prevented.

In the preferred embodiment, each shock absorber SA is used in which the damping force characteristic in one of the extension and compression phases is fixed to provide the soft damping force characteristic in the other of the extension and compression phases is variably controlled to provide the hard characteristic. The present invention is applicable to a suspension control system having such each of other types of shock absorbers that the damping force characteristics in both of the extension and compression phases are simultaneously varied may be used. Such the other types of the shock absorbers as described above are exemplified by a U.S. Pat. No. 5,497,862 issued on Mar. 12, 1996, the disclosure of which is herein incorporated by reference.

Figure 17A:
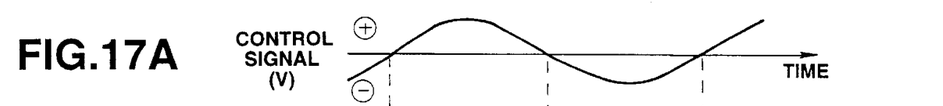
FIGS. 17A, 17B, 17C, 17D, and 17E are integrally a timing chart for the contents of the damping force characteristic control in the preferred embodiment of the suspension control system shown in FIG. 3.
Figures 17B, 17C:
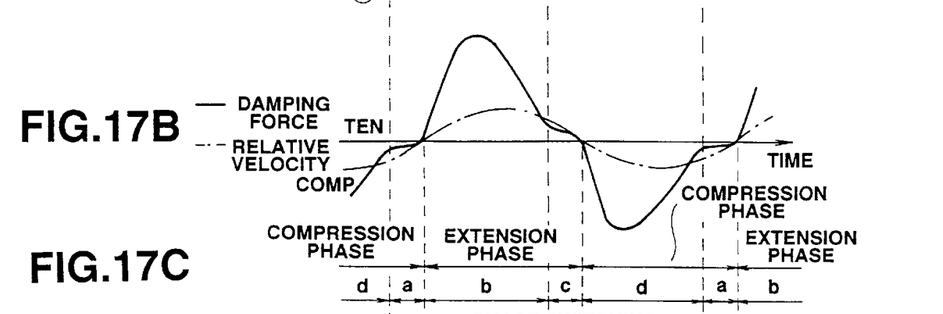
Figure 17D:
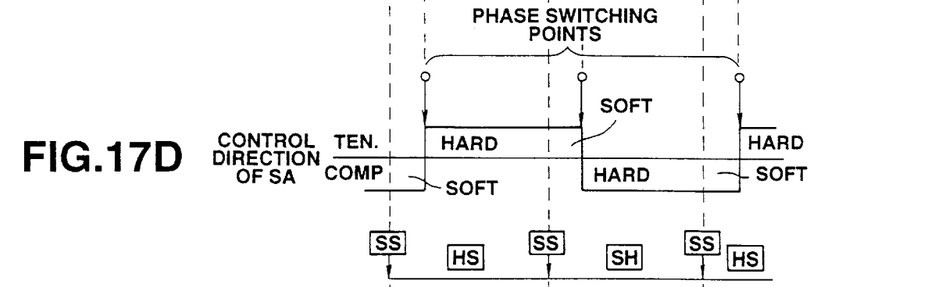
Figure 17E:
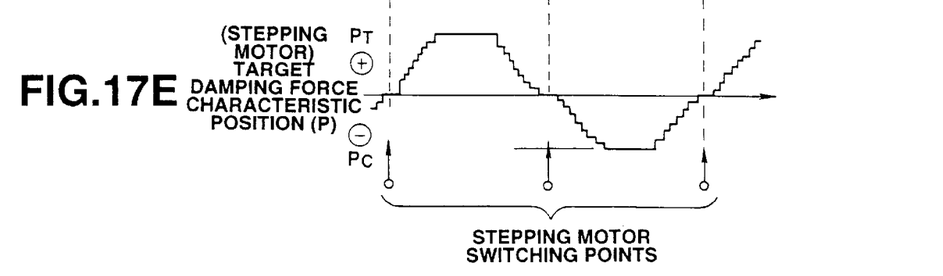

It is noted that in FIG. 17B, TEN denotes the extension phase and COMP denotes the compression phase.

It is also noted that although the front right and rear right positioned shock absorbers $SA_{FR}$ and $SA_{RR}$ are omitted from FIGS. 1 and 2, these shock absorbers $SA_{FR}$ and $SA_{RR}$ are, of course, installed at given positions between the cab 5 and chassis 6.

What is claimed is:

1. An apparatus for a cab over type truck, comprising:
   a plurality of shock absorbers, each shock absorber being interposed between a vehicle cab of the truck and a vehicle chassis of the truck and having a damping force characteristic varying member arranged so as to enable a variation in the damping force characteristic of its corresponding shock absorber in response to an input control signal;
   a first detector for detecting a behavior of the vehicle cab and for developing a signal indicative of the behavior of the vehicle cab;
   a basic damping force characteristic controller for developing the control signal to control the damping force characteristic of each shock absorber via the corresponding damping force characteristic varying member on the basis of the vehicle cab behavior indicative signal developed by the first detector;
   a second detector for detecting a behavior of a vehicle trailer of the cab over type truck hauled by the vehicle chassis and for developing a signal indicative of the behavior of the vehicle trailer; and
   a corrective controller for modifying a value of the control signal developed by the basic damping force characteristic controller so as to correct the control of the damping force characteristic carried out by the basic damping force characteristic controller on the basis of the vehicle trailer behavior indicative signal.

2. An apparatus for a cab over type truck as claimed in claim 1, wherein the first detector comprises at least a pair of front and rear vertical behavior detectors for detecting vertical behaviors of both of a front position of the vehicle cab and a rear position of the vehicle cab.

3. An apparatus for a cab over type truck as claimed in claim 2, wherein the second detector comprises: a first road wheel speed detector for detecting a first road wheel speed of a road wheel located at a vehicle chassis of the cab over type truck; a second road wheel speed detector for detecting a second road wheel speed of a road wheel located at the vehicle trailer of the truck; and a determinator for determining the behavior of the trailer from a road wheel speed difference between the detected first and second road wheel speeds.

4. An apparatus for a cab over type truck as claimed in claim 3, wherein the corrective controller corrects the value of the control signal developed by the basic damping force controller on the basis of the road wheel speed difference and a predetermined function.

5. An apparatus for a cab over type truck as claimed in claim 4, wherein the corrective controller calculates front and rear correction values (vp) to correct each corresponding control signal as follows: vp=Vp*τ, wherein Vp denotes the road wheel speed difference and τ denotes the function to convert the road wheel speed difference into the behavior of the vehicle cab.

6. An apparatus for a cab over type truck as claimed in claim 5, wherein the predetermined function τ comprises a band pass filter having at least a predetermined first-order characteristic.

7. An apparatus for a cab over type truck as claimed in claim 6, which further comprises a vehicle speed sensor for detecting a running speed of the cab over type truck and wherein the corrective controller derives first and second corrective coefficients ($K_f$ and $K_r$) according to the detected running speed (BV) of the cab over type truck and derives the correction values (vp* $K_f$ and vp*$K_r$) to be included in the control signal to be supplied to each corresponding shock absorber.

8. An apparatus for a cab over type truck as claimed in claim 7, wherein the shock absorbers are a first shock absorber ($SA_{FL}$) located at a front left vehicle cab, a second shock absorber ($SA_{FR}$) located at a front right vehicle cab, a third shock absorber located at a rear left vehicle cab, and a fourth shock absorber located at a rear right vehicle cab and the basic damping force controller finally outputs respective control signals ($V_{FL}$, $V_{FR}$, $V_{RL}$, and $V_{RR}$) as follows:

$$V_{FL}=V_f+vp*K_f,$$

$$V_{FR}=V_f+vp*K_f,$$

$$V_{RL}=V_r-vp*K_r,$$

$$V_{RR}=V_r-vp*K_r.$$

9. An apparatus for a cab over type truck as claimed in claim 8, wherein the basic damping force controller determines a relative velocity between the vehicle cab and the vehicle chassis using a predetermined transfer function (Gu(s)) from the vehicle cab behavior signal developed from the first detector.

10. A method for controlling a damping force characteristic of each of shock absorbers, each shock absorber being interposed between a vehicle cab of a cab over type truck and a vehicle chassis of the truck and having a damping force characteristic varying member arranged so as to enable a variation in the damping force characteristic of its corresponding shock absorber in response to an input control signal, the method comprising the steps of;
   a) detecting a behavior of the vehicle cab;
   b) developing the control signal to control the damping force characteristic of each shock absorber via the corresponding damping force characteristic varying member on the basis of the detected vehicle cab behavior;
   c) detecting a behavior of a vehicle trailer of the cab over type truck hauled by the vehicle chassis; and
   d) modifying a value of the control signal so as to correct the control of the damping force characteristic on the basis of the vehicle trailer behavior.

* * * * *